Figures 1, 2, 3:
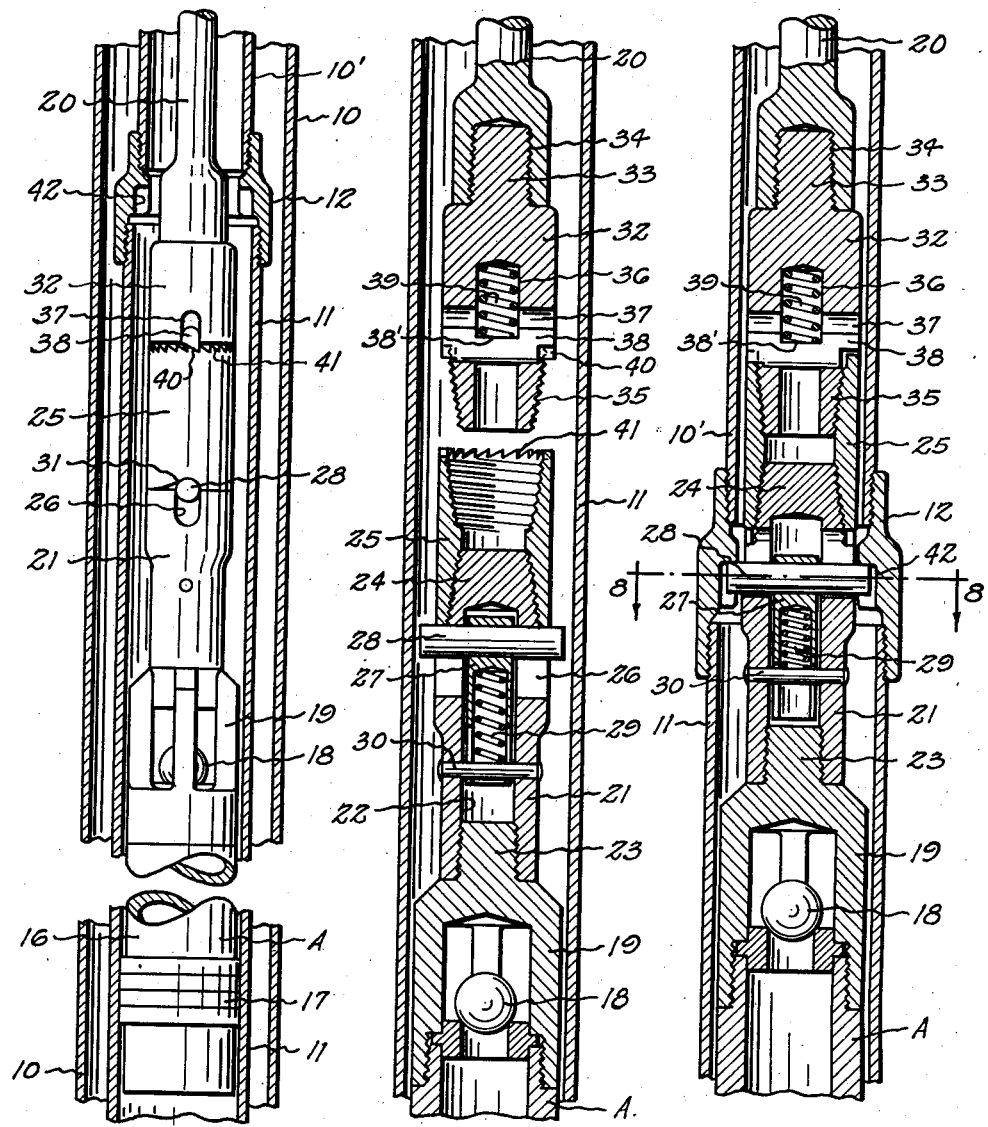

Jan. 6, 1942. O. STAERKER 2,268,909
COUPLING
Filed June 18, 1938 3 Sheets-Sheet 1

Inventor
Otto Staerker

By Jack A. Ehly
Attorney

Jan. 6, 1942.   O. STAERKER   2,268,909
COUPLING
Filed June 18, 1938   3 Sheets-Sheet 2

Inventor
Otto Staerker

Jack A Ashley
Attorney

Jan. 6, 1942.   O. STAERKER   2,268,909
COUPLING
Filed June 18, 1938   3 Sheets-Sheet 3
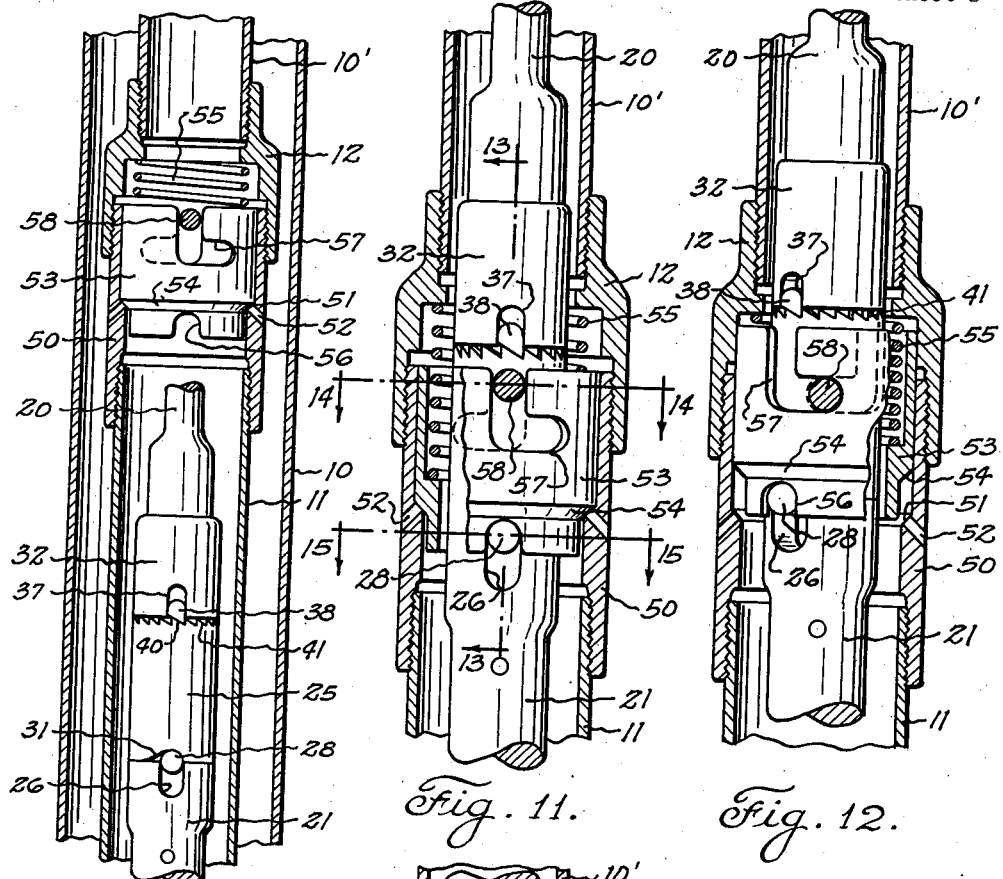
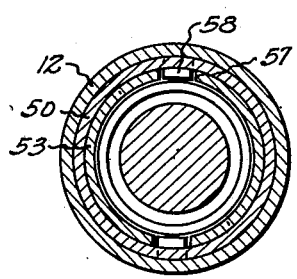
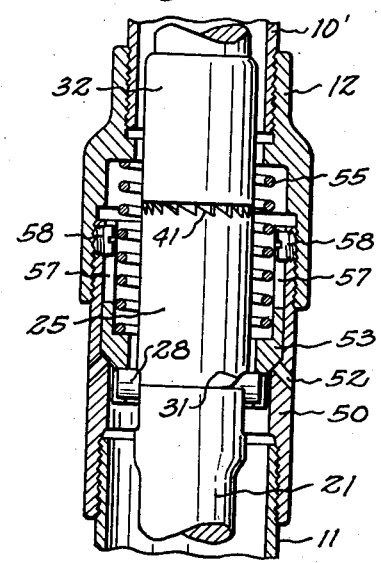
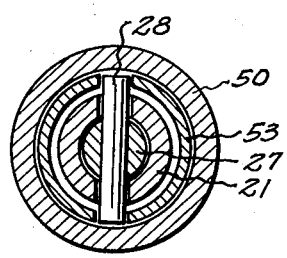
Inventor
Otto Staerker
By Jack A. Athley
Attorney Patented Jan. 6, 1942

2,268,909

UNITED STATES PATENT OFFICE 2,268,909

COUPLING

Otto Staerker, Gladewater, Tex.

Application June 18, 1938, Serial No. 214,414

14 Claims. (Cl. 103—226)

This invention relates to new and useful improvements in couplings.

One object of the invention is to provide an improved coupling which is an improvement on the coupling disclosed in my copending application, Serial No. 195,207, filed March 11, 1938, and which is particularly adapted for use in connecting well pumping rods with a valve, pump plunger or other member.

An important object of the invention is to provide an improved coupling for connecting the pump rods to the pump plunger, or other element, which coupling is so constructed that the connection may be made or broken within the tubing after said tubing has been set in the well bore, whereby the pump rods may be run into and removed from the well, separately and independently from the well tubing.

A particular object of the invention is to provide an improved coupling arranged to connect the usual pump rods with a pump plunger, said coupling being connected to one of the coupled members by left-hand threads and to the other member by right-hand threads; there also being means for preventing rotation at one of the thread connections while the other thread connection is being made up or disconnected, whereby the members may be readily connected or disconnected from the surface and while said members are disposed within the well tubing.

Another object of the invention is to provide an improved coupling including a pair of threaded members adapted to be connected together, and having coacting means which is adapted to prevent reverse rotation of the members after the same have been connected, so as to prevent uncoupling of the members, said coacting means being so arranged that it does not interfere with the connection as it is being made up and functions after the connection is complete.

A further object of the invention is to provide an improved coupling for connecting a pump plunger and the pump rods of a well, which coupling includes means for bleeding or draining the fluid from above the plunger whenever desired, said draining means being so arranged that it does not interfere with the normal operation of the plunger.

A construction designed to carry out the invention will be hereinafter described, together with other features of the invention.

Figure 4:
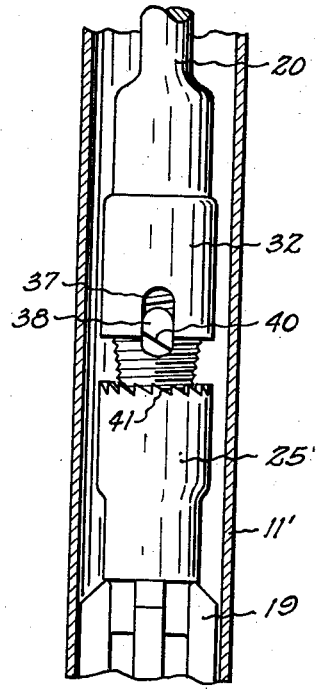
Figure 5:
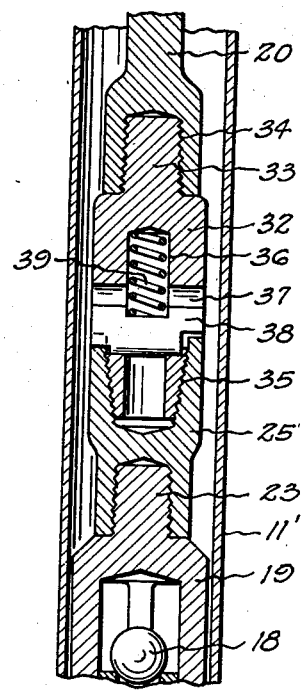
Figure 6:
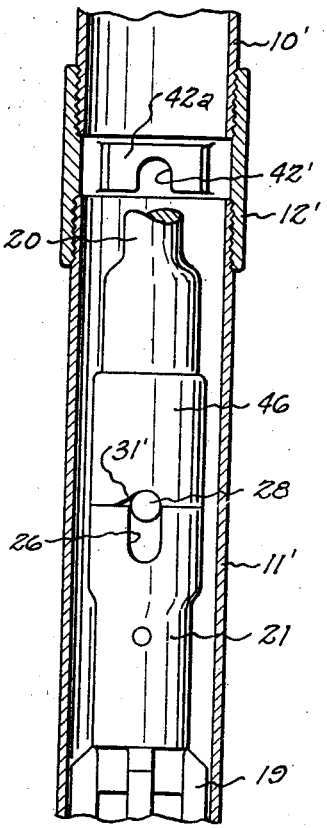
Figure 7:
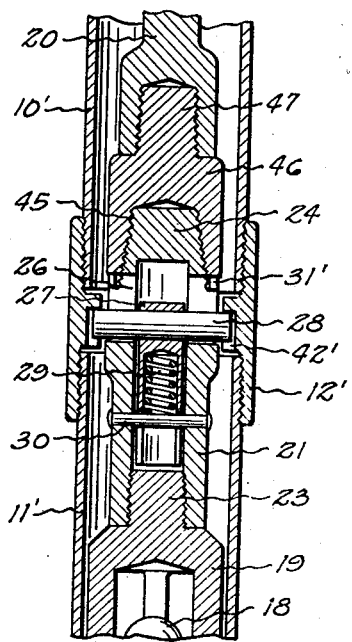
Figure 8:
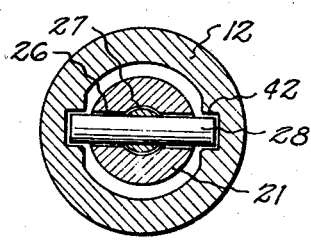
Figure 9:
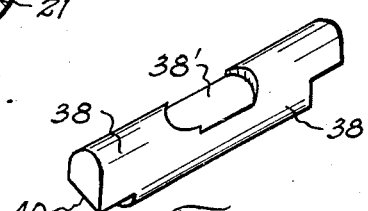

The invention will be more readily understood from a reading of the following specification and by reference to the accompanying drawings, in which an example of the invention is shown, and wherein:

Figure 1 is a view, partly in elevation and partly in section, of an improved coupling, constructed in accordance with the invention and illustrated as applied to a pump plunger and pump rod, Figure 2 is a transverse, vertical, sectional view showing the coupling members disconnected, Figure 3 is a view similar to Figure 2 showing the coupling members connected and moved to a position in readiness for disconnection, Figure 4 is an enlarged elevation of the upper portion of the coupling as used alone in connecting the pump plunger with the rod, Figure 5 is a transverse, vertical, sectional view of the same, showing the same in a coupled position, Figure 6 is an enlarged elevation of the lower portion of the coupling as used alone in connecting the pump rod with the pump plunger, Figure 7 is a transverse, vertical, sectional view of the same, Figure 8 is a horizontal, cross-sectional view taken on the line 8—8 of Figure 3, Figure 9 is an isometric view of the spring-pressed connecting pin, Figure 10 is a view, partly in elevation and partly in section, and showing a modified form of the invention, wherein a bleeder valve is used in combination with the coupling, Figure 11 is a view, partly in elevation and partly in section, showing the coupling within the bleeder valve, with said valve in a closed position, Figure 12 is a view similar to Figure 11, showing the bleeder valve in an open position, Figure 13 is a transverse, vertical, sectional view taken on the line 13—13 of Figure 11, Figure 14 is a horizontal, cross-sectional view, taken on the line 14—14 of Figure 11, and Figure 15 is a horizontal, cross-sectional view taken on the line 15—15 of Figure 11.

In the drawings, the numeral 10 designates a well casing of the usual construction, which has the ordinary well tubing 10' extending axially therethrough. A working barrel 11, which has a larger diameter than the tubing 10', is connected to the lower end of said tubing by means of a swaged collar 12 and the lower end of said working barrel is connected by a collar 13 with the usual well screen 14. A standing valve 15 is mounted between the ends of the working barrel 11 and the screen 14 and is arranged to permit an upward flow through the working barrel, while preventing a downward flow therethrough in the usual manner.

A pump plunger A is movable vertically within the working barrel 11 and includes a tubular mandrel 16 having the usual packing element 17 thereon. A travelling valve 18 of the usual construction is located within a cage 19 which is secured to the upper end of the mandrel 16. As the pump plunger A reciprocates within the working barrel, fluid is drawn upwardly past the standing valve 15 and then flows upwardly through the mandrel 16, past the valve 18 and finally into the tubing 10' above the working barrel 11. The valves 15 and 18 operate in the usual manner.

The pump plunger A is carried by the usual pump rods 20 which extend downwardly through the tubing 10' and have their lower ends connected to the plunger. As the pump rods are reciprocated within the tubing, the plunger is moved vertically within the working barrel to perform the pumping operation. As is well known, it is desirable that the well tubing 10' and the pump rods 20 be run separately or independently, because in order to run both the tubing and the rods simultaneously, it is necessary that a number of men and considerable equipment be employed. By running the tubing and setting the same in position within the well casing and then running the rods 20, the well operations are facilitated. Since the plunger A is operating within a working barrel 11, which has a larger diameter than the well tubing 10', it is evident that said plunger cannot be run through the tubing. Therefore, it is necessary that said plunger be located in the working barrel before the tubing and barrel are run into the well. However, at the time that the tubing, barrel and plunger are set within the casing, the rods 20 are not connected to said plunger. After the tubing has been set, the rods are then run therethrough and are connected to the plunger by the improved coupling which is hereinafter described.

For connecting and disconnecting the rods with the pump plunger after the same is disposed in the well, a coupling element which includes a lower member or sleeve 21 is provided. The axial bore 22 of the member or sleeve 21 has its lower end screw-threaded so as to receive an upstanding axial pin 23 which is provided on the travelling valve cage 19. An upwardly extending pin 24 is formed at the upper end of the member or sleeve 21 and this pin is provided with external, left-hand screw threads. The pin is adapted to engage within the lower end of a threaded collar 25 whereby the collar and member 21 may be readily connected. With this arrangement, the lower member or sleeve 21, as well as the collar 25 of the coupling element, is carried by the plunger A and obviously, since the collar 25 is connected to the member 21 by left-hand threads, these two parts may be separated or disconnected, without disconnecting the member 21 from the pin 23 of the cage 19, as the latter employs the usual standard right-hand threads. Also the collar 25 may be disconnected from the pin 24 of the member 21 without disconnecting any of the other connections in the pump rods, as will be explained.

For preventing the accidental unscrewing of the collar 25 from the pin 24, the member 21 is formed with radial slots or openings 26 at the upper end of the bore 22. A tubular plunger 27 is slidable within the bore and a transverse, radially extending pin 28 is mounted within the upper end of said plunger, the extremities of said pin being movable within the radial slots 26 in the member. A coiled spring 29 engages within the tubular plunger 27 and has its lower end resting on a transverse pin 30 which extends across the bore of the member 21 near the lower end thereof. The spring exerts its pressure to constantly urge the plunger 27 and the pin 28 upwardly, whereby said pin is normally held at the upper end of the radial slots 26.

When the collar 25 is threaded onto the pin 24, the lower end of said collar abuts the upper end of the member 21 and the extremities or ends of the pin 28 are adapted to engage within recesses 31 (Figure 1) which recesses are formed in the lower edge portion of the collar 25. When the ends of the pin are so engaged, rotation of the collar 25 with relation to the member 21 in a direction to unscrew the connection, is prevented and therefore an accidental or unintentional unscrewing of the parts is prevented. The pin 28 and the recesses or notches 31 which coact therewith, thereby provide a lock for holding the connected parts 25 and 21 together.

In the operation of the device, the well tubing 10' and the working barrel 11 are run into the well casing 10 and are set therein in the usual manner. At this time, the lower element or sleeve 21 is secured to the upper end of the travelling valve cage 19 and also the collar 25 is connected to the pin 24 of the member 21. These parts have been mounted on the plunger previously to the time that said plunger was inserted into the working barrel and before said barrel was connected to the well tubing 10' by the collar 12. Thus, when the tubing and working barrel are run into the well, the plunger A, carrying the member 21 and the collar 25, is located therein.

After the tubing and barrel are suitably set within the well casing, the pump rods 20 are run through the tubing 10'. The lower end of the pump rods carry the upper coupling member 32, which member has an upstanding pin 33 threaded into the socket 34 provided on the lowermost pump rod. The lower end of the member 32 has a depending axial pin 35 which is provided with external, right-hand screw threads, which threads are adapted to be threaded into the upper end of the collar 25. Thus, after the plunger is located within the well, it is only necessary to run the rods 20 downwardly through the tubing and to engage the pin 35 in the collar 25. By rotating the rods, the pin 35 may be screwed into the collar 25 and, since this is a right-hand threaded connection, all of the standard right-hand threads in the string are tightened by the action. The only left-handed threads are those connecting the lower end of the collar 25 to the lower member 21 of the coupling and loosening or unscrewing of these threads is prevented by the engagement of the ends of the pin 28 in the notches or recesses 31 of the collar, as has been explained. In this manner, the rods 20 may be readily connected to the collar 25, whereby the rods 20 are connected to the plunger A by means of the upper coupling member 32, collar 25 and the lower coupling member 21.

For preventing the unscrewing of the pin 35 on the lower end of the upper member 32 from within the collar 25, the upper member 32 is formed with an axial bore 36. Elongate radial slots 37 extend outwardly from this bore and are located nearer the lower end of the member 32, as is clearly shown in Figures 2 and 4. A transverse pin 38 extends through the radial slots 37 and transversely of the bore 36 and a coiled spring 39 has its lower end resting within a recess 38' provided in the top of the pin 38. The upper end of the spring 39 engages the upper end of the bore 36 and obviously, said spring exerts its pressure to hold the pin 38 in a lowermost position at the bottom of the slots 37. The extremities of the pin 38 are bevelled or inclined as shown at 40, whereby a pawl or ratchet tooth is formed.

When the pin 35 on the lower end of the member 32 is threaded into the collar 25, the extremities of the pin 38 are adapted to engage ratchet teeth or serrations 41 which are formed on the upper edge of the collar 25. The teeth are so constructed that they permit a rotation of the pin 35 with relation to the collar in a direction which permits tightening of said pin within the collar. However, after the connection is made, the pawls or ratchet teeth 40 on the locking pin 38 engage the ratchet teeth 41 on the collar 25 to prevent a reverse rotation of the member 32. Therefore, after the connection is made, it is impossible to disconnect the pin 35 from the collar 25 until the locking pin 38 is raised so that the pawls or ratchet teeth 40 thereon, may clear the serrations or teeth 41 on the collar 25. This provides a positive means for locking the parts together and preventing the unscrewing thereof.

As has been explained, the plunger A having the lower coupling member 21 and the collar 25 secured thereto is run into the well with the tubing and the working barrel 11. After said tubing and barrel are properly set, the rods 20 are then run through the tubing 10' and these rods carry the upper coupling member 32. The rods are lowered until the pin 35 on the coupling member 32 engages within the upper end of the collar 25, after which the rods are rotated so as to screw the right-hand threads of the pin 35 into the collar 25. This rotation of the rods serves to tighten all of the right-hand connections in the string. As the pin 35 is rotated so as to be connected with the collar 25, the left-hand thread connection between the collar 25 and the pin 24 of the lower coupling element 21, cannot be disconnected because of the engagement of the ends of the pin 28 with the notches or recesses 31 in the lower edge portion of the collar 25. After the pin 35 is completely within the collar 25, the spring-pressed locking pin 38 has its inclined ends engaged with the ratchet teeth or serrations 41 on the upper end of the collar 25, whereby disengagement or unscrewing of the pin 35 is prevented. Therefore, after the connection between the coupling member 32 and the collar 25 is made, said connection cannot be separated until the pin 38 is lifted so that its ends disengage the teeth 41.

After the upper member 32 is connected in the collar, it is manifest that the rods 20 are connected with the pump plunger A by means of the member 32, collar 25 and the member 21. The rods may be reciprocated in the usual manner, whereby the plunger A is reciprocated within the working barrel 11 to lift the well fluid in the usual manner. When it is desired to remove the rods 20, said rods are lifted or raised upwardly, whereby the entire coupling as well as the plunger is moved upwardly within the working barrel. Upward movement of the rods and coupling may continue until the extended ends of the transverse pin 28 in the lower coupling member 21 enter a pair of diametrically opposed notches or slots 42, which notches are formed in the walls of the coupling collar 12. When the pin engages said notches 42, (Figures 3 and 8) further upward movement of said pin is prevented and as the rods continue an upward movement said pin is moved to the lower end of the radial openings or slots 26 in the wall of the member 21, whereby said pin disengages the notches or recesses 31 in the lower edge portion of the collar 25. When this occurs, the rods may be rotated in a direction to unscrew the left-hand threads between the pin 24 of the member 21 and the collar 25. Rotation of the member 21 is prevented by engagement of the pin 28 in the notches 42 of the coupling collar 12. As the rods are rotated, the left-hand connection between the pin 24 and the collar 25 is unscrewed, whereby the rods may be disconnected from the plunger. It is noted that the rotation of the rods in unscrewing the left-hand threads will tend to tighten all of the other threads, which are the standard right-hand threads, in the string. After the collar 25 is unscrewed from the pin 24, the rods may be readily removed prior to the removal of the tubing, working barrel or plunger.

From the foregoing, it will be obvious that the improved coupling comprises a lower member 21 carried by the plunger A and an upper member 32 carried by the rods 20. The upper and lower members are arranged to be connected together by the collar 25, which collar has right-hand threads at its upper end and left-hand threads at its lower end. The connection between the rods and plunger is made by screwing the upper member 32 into the right-hand threads of the collar 25; the disconnection or uncoupling of the rods and plunger is accomplished by unscrewing the left-hand threads of the collar 25 from the pin 24 of the lower member. A locking means is provided for preventing uncoupling of the parts from the collar until such time as the locking pins 28 and 38 are disengaged from their coacting recesses and teeth respectively. This arrangement permits the tubing to be run into and set in the well independently of the rods. Also, said rods may be readily removed at any time without removing the tubing. This makes it possible to employ the larger working barrel and the larger plunger with the tubing of a smaller diameter, whereby more efficient pumping may be accomplished.

It is noted that it is not necessary to employ both the upper member 32 and the lower member 21 at all times and, in Figures 4 and 5, the upper member 32 is shown as employed by itself. In this form, a collar 25', similar in construction to the collar 25, has its lower end reduced and provided with right-hand threads which are adapted to receive the upstanding pin 23 of the travelling valve 19. This collar 25' is fastened to the plunger A when the same is lowered with the well tubing into the well. The upper coupling member 32 is carried by the lower end of the rods 20 and is adapted to be threaded into the upper end of the collar 25'. The upper end of the collar 25' has right-hand screw threads and also has its upper end provided with ratchet teeth or serrations 41' whereby the ends of the locking pin 38 carried by the member 32 may engage said teeth when the parts are coupled. In using the upper element 32 with the modified form of collar 25', it is possible to lower the rods through the tubing after the latter has been set, and to couple said rods to the plunger A. However, after the connection is made, it is not possible to remove the rods without removing the plunger.

In Figures 6 and 7, the lower coupling member 21 is shown as connecting the rods to the plunger A, the upper element 32 being omitted. In this case, the upwardly extending pin 24 on the member 21 is threaded into a socket 45 provided in a coupling element 46. The element 46 has a pin 47 which is threaded into the socket in the lowermost pump rod 20. The threads on the pin 24 and within the socket 45 are left-handed. Obviously, with this arrangement, the rods 20 having the coupling element 46 at their lower ends may be run into the tubing after the plunger A has been lowered therein. The rods are lowered until the pin 24 on the upper end of the member 21 engages within the socket 45, after which the rods are rotated so as to connect the elements together. After the connection is made, the transverse pin 28 engages notches 31' formed in the lower edge portion of the element 46, whereby accidental or unintentional disengagement of the connection is prevented. When it is desired to uncouple the elements, it is only necessary to lift the rods until the transverse pin 28 engages within recesses or notches 42' provided in diametrically opposed lugs 42a formed in a coupling collar 12', which latter collar connects the well tubing 10' with the working barrel 11'. When the pin is engaged in said notches, continued upward movement of the rods disengages said pin from the recesses 31' in the coupling element 46, whereby rotation of the rods to uncouple the pin 24 from the socket 45 is permitted. If it is not desired to uncouple the parts, right hand threads may be formed on the pin 24 and within the socket 45.

It is desirable in many instances, to drain or bleed the tubing above the pump plunger A, whereby the well fluid in the tubing string above said plunger may flow back into the well casing. In Figures 10 to 15, a bleeder valve arrangement which may be employed with the improved coupling herein described, is shown. The bleeder valve includes a sleeve member 50 which is adapted to be connected to the swaged collar 12 and to the upper end of the working barrel 11. The bore of the sleeve is formed with an internal, annular bevelled seat or shoulder 51 and a plurality of bleeder ports 52 extend through the wall of the sleeve, having their inner ends exposed to the seat. A valve member or collar 53 is slidable within the sleeve and also within the swaged collar 12 and is provided with an external, annular seating surface 54 which is adapted to engage the seat 51. The valve member or collar 53 is normally held in its seated position by a coiled spring 55 and, by observing Figures 10, 11 and 13, it will be manifest that when seated, the valve member closes the ports 52, whereby a flow from the tubing into the casing cannot occur.

The bore of the valve member or collar 53 is sufficient to permit the upper portion of the coupling member which connects the rods 20 to the plunger A to pass therethrough. However, the projecting ends of the locking pin 28 in the lower coupling member 21 are adapted to engage within recesses 56 formed in the lower edge of the valve member 53, whereby when the rods 20 and coupling are pulled upwardly through the valve member, said projecting ends of the locking pin 28 will serve to lift the valve member under tension of the spring 55. When the valve member is lifted in this manner, fluid in the tubing above said valve member may flow downwardly through the valve member and may escape through the ports 52 which are uncovered when the valve member is raised (Figure 12).

For holding the valve member or collar 53 in a raised position and also for holding the same against rotation, said member is provided with a pair of diametrically opposite L-shaped slots 57, which are formed in the upper end of said member. An inwardly extending screw 58 which is mounted in the upper end of the sleeve 50 is arranged to ride within each slot 57. Normally the screws 58 are in the position shown in Figures 11 and 13 with the valve member seated. When the rods 20 and coupling are lifted so that the pin 28 engages the notches 56 in the valve member 53 and said valve member is raised under tension of the spring 55, the pins or screws 58 move downwardly in the vertical portion of the slots 57. After this position is reached, the rods 20 may be rotated which will cause the screws 58 to ride into the horizontal or lateral portion of the slots 57, as shown in Figure 12, whereby the valve member is locked against downward movement. The engagement of the screws within the lateral portion of the slots 57 also prevents further rotation of the valve member 53 and, therefore, if desired, a continued rotation may be imparted to the rods, whereby disconnection of the left-handed screw threads between the member 21 and the collar 25 may be effected.

So long as the valve member or collar 53 remains in its raised position, any fluid from thereabove may flow downwardly past said valve member and through the ports 52 into the casing 10. If it is desired to return the valve member to a seated position, it is only necessary to rotate the same until the screws 58 move into alinement with the vertical portions of the slots 57. When this occurs, the coupling and rods may be moved downwardly so that the locking pin 28 disengages the notches 56, after which the coiled spring will immediately return the valve member to a seated position. It is noted that the valve member not only provides a means whereby the fluid trapped above the plunger may be conducted from the tubing, but the notches in the lower end of said valve member provide a means whereby the plunger and the lower coupling member 21 may be held stationary while the rods are rotated to effect a disconnection of the rods with said plunger.

What I claim and desire to secure by Letters Patent is:

1. The combination with a well tubing having a pump plunger and pump rods reciprocable therein of a coupling including, a coupling member attached to the plunger, a collar connected to the coupling member by left-hand threads, an upper coupling member attached to the rods and connected with said collar by right-hand threads, said tubing having bleeder ports therein located above the plunger for establishing communication between the interior and exterior of the tubing, an annular valve member for closing said ports, and means on one of the coupling members for engaging said member to raise the same when the coupling is raised, whereby the bleeder ports are opened to permit the tubing to drain.

2. The combination with a well tubing having a pump plunger and pump rods reciprocable therein of a coupling including, a coupling member attached to the plunger, a collar connected to the coupling member by left-hand threads, spring-pressed means mounted in the member and engageable with the collar for preventing reverse rotation of the members to prevent unintentional uncoupling thereof, an upper coupling member attached to the pump rods and connected with the collar by right-hand threads, the tubing having bleeder ports for establishing communication between the interior and exterior thereof, and a valve member normally in a seated position closing said ports, said member being arranged to be engaged by the spring-pressed means mounted in the first mentioned coupling member, whereby upward movement of said coupling will raise said valve member to uncover the bleeder ports.

3. A coupling for connecting a pair of elements which are adapted to be lowered through a tubular conductor and including, a collar having a threaded bore and attached to one of the elements to be coupled, a coupling member carried by the other element and screwed into the collar, co-acting means on the collar and member for preventing unintentional disconnection of these parts, and means within the conductor arranged to cooperate with one of said co-acting means to actuate and engage the same and also to prevent rotation of this co-acting means as well as the member to permit disconnection of said collar and member.

4. A coupling for connecting a pair of elements which are adapted to be lowered through a tubular conductor and including, a lower coupling member attached to one of the elements to be coupled, an upper coupling member carried by the other element, a collar connected with one of the coupling members by means of a left-hand thread and connected to the other member by means of a right-hand thread, means associated with the left-hand threads to prevent disconnection thereof when the right-hand threads are coupled, and an abutment within the conductor constructed and arranged to co-act with the last named means to actuate the same and to hold the same against rotation to permit unscrewing of the collar and member connected thereto by left-hand threads.

5. A coupling for connecting a pair of elements which are adapted to be lowered through a tubular conductor and including, a lower coupling member attached to one of the elements to be coupled, an upper coupling member carried by the other element, a collar connected with one of the coupling members by means of a left-hand thread and connected to the other member by means of a right-hand thread, spring-pressed means carried by the first coupling member and engageable with the collar for preventing disconnection of the left-hand threads when said collar is connected with the other member by right-hand threads, and an abutment within the conductor constructed and arranged to co-act with the last named means to disengage the same from the collar and to hold said means as well as the first coupling member against rotation to permit disconnection of the collar and first coupling member.

6. A coupling for connecting a pair of elements which are adapted to be lowered through a tubular conductor and including, a collar having a threaded bore and attached to one of the elements to be coupled, a coupling member carried by the other element and screwed into the collar, a transversely extending bar carried by the member and engaging the collar, the bar having its extremities extending beyond the external surface of these parts, and an abutment within the conductor constructed and arranged to co-act with the extremities of said bar to disengage the same from the collar and also to lock the same against rotation to permit disconnection of said collar and member.

7. A coupling for connecting a pair of elements which are adapted to be lowered through a tubular conductor and including, a lower coupling member attached to one of the elements to be coupled, an upper coupling member carried by the other element, a collar connected with one of the coupling members by means of a left-hand thread and connected to the other member by means of a right-hand thread, means associated with the right-hand threads for locking the same against accidental and unintentional disconnection, means associated with the left-hand threads to prevent disconnection thereof when the right-hand threads are coupled, and an abutment within the conductor constructed or arranged to co-act with the last named means to actuate the same and to lock said means against rotation to permit disconnection of the collar and member connected thereto by left-hand threads.

8. The combination with a pump plunger and pump rods for reciprocating the same within a working barrel of a coupling including, a lower coupling member carried by the plunger and having an upstanding pin provided with external left-hand screw threads, a collar threaded onto the pin and having the upper end of its bore formed with right-hand screw threads, an upper coupling member attached to the pump rods and screwed into the right-hand threads of the collar, coacting means on the collar and lower coupling member for preventing rotation of these parts with relation to each other, whereby the connection between the upper member and collar may be made without disconnecting the left-hand threads of said collar from the lower member, and means within the working barrel arranged to cooperate with one of said co-acting means to disengage the same from the other co-acting means and to lock said means as well as said lower member against rotation to permit disconnection of the collar and lower member.

9. The combination with a pump plunger and pump rods for reciprocating the same within a working barrel of a coupling including, a lower coupling member carried by the plunger and having an upstanding pin provided with external left-hand screw threads, a collar threaded onto the pin and having the upper end of its bore formed with right-hand screw threads, an upper coupling member attached to the pump rods and screwed into the right-hand threads of the collar, co-acting means on the collar and lower coupling member for preventing rotation of these parts with relation to each other, whereby the connection between the upper member and collar may be made without disconnecting the left-hand threads of said collar from the lower member, and an abutment within the working barrel arranged to cooperate with one of said co-acting means to disengage the same from the other co-acting means, the abutment also cooperating with the disengaged means to lock said means and the lower member against rotation to permit disconnection of the collar and lower member.

10. The combination with a pump plunger and pump rods for reciprocating the same within a working barrel of a coupling including, a lower coupling member carried by the plunger and having an upstanding pin provided with external left-hand screw threads, a collar threaded onto the pin and having the upper end of its bore formed with right-hand screw threads, an upper coupling member attached to the pump rods and screwed into the right-hand threads of the collar, spring-pressed means carried by the lower coupling member and engageable with the collar for preventing rotation of these parts with relation to each other, and an abutment within the working barrel arranged to cooperate with said means to disengage the same from the collar, the abutment also cooperating with the means to lock said means and lower member against rotation to permit disconnection of said collar and lower coupling member, whereby the pump rods may be disconnected from the plunger within the working barrel.

11. The combination with a pump plunger and pump rods for reciprocating the same within a working barrel of a coupling including, a lower coupling member carried by the plunger and having an upstanding pin provided with external left-hand screw threads, a collar threaded onto the pin and having the upper end of its bore formed with right-hand screw threads, an upper coupling member attached to the pump rods and screwed into the right-hand threads of the collar, a transversely extending bar carried by the lower coupling member and engaging the collar, the bar having its extremities extending beyond the external surface of these parts, and an abutment within the working barrel constructed and arranged to co-act with the extremities of said bar to disengage the same from the collar and to lock the same against rotation to permit disconnection of the plunger and pump rods within said barrel through disconnection of said collar and lower member.

12. The combination with a pump plunger and pump rods for reciprocating the same within a working barrel of a coupling including, a lower coupling member carried by the plunger and having an upstanding pin provided with external left-hand screw threads, a collar threaded onto the pin and having the upper end of its bore formed with right-hand screw threads, an upper coupling member attached to the pump rods and screwed into the right-hand threads of the collar, co-acting means on the collar and lower coupling member for preventing rotation of these parts with relation to each other, whereby the connection between the upper member and collar may be made without disconnecting the left-hand threads of said collar from the lower member, means within the working barrel arranged to cooperate with one of said co-acting means to disengage the same from the other co-acting means and to lock said means as well as said lower member against rotation to permit disconnection of the collar and lower member, and co-acting means on the upper member and collar for preventing unintentional unscrewing of these elements after they have been connected and also for preventing unscrewing of said elements when the left-hand threads are disconnected.

13. A coupling for connecting a pair of elements which are adapted to be lowered through a tubular conductor and including, a collar having a threaded bore and attached to one of the elements to be coupled, a coupling member carried by the other element and screwed into the collar, the second element having a transverse slot, a diametrically extending spring-pressed pin within said slot having its extremities extending beyond the exterior of said element, the adjacent end of the collar having recesses adapted to receive the pin when the collar and element are screwed together, whereby disconnection of these parts is prevented, and means within the conductor arranged to cooperate with the extended ends of the pin to depress the same and disengage it from the recesses to permit unscrewing of said collar and the element within which the pin is mounted.

14. A coupling for connecting a pair of elements which are adapted to be lowered through a tubular conductor and including, a collar having a threaded bore and attached to one of the elements to be coupled, a coupling member carried by the other element and screwed into the collar, the second element having a transverse slot, a diametrically extending spring-pressed pin within said slot having its extremities extending beyond the exterior of said element, the adjacent end of the collar having recesses adapted to receive the pin when the collar and element are screwed together, whereby disconnection of these parts is prevented, and a slotted abutment within the conductor adapted to receive the extended ends of the pin to depress the same and also to lock said pin and the element within which the pin is mounted against rotation to permit disconnection of said element and collar.

OTTO STAERKER.